United States Patent [19]

Graves

[11] Patent Number: 4,674,550
[45] Date of Patent: Jun. 23, 1987

[54] WINDOW SHADE MOTOR AND ROLLER ASSEMBLY

[75] Inventor: Delbert B. Graves, Nora, Ill.

[73] Assignee: Newell Co., Freeport, Ill.

[21] Appl. No.: 638,304

[22] Filed: Aug. 6, 1984

[51] Int. Cl.⁴ .............................................. A47H 1/13
[52] U.S. Cl. ...................................... 160/326; 160/301
[58] Field of Search ................ 160/326, 323, 300, 301

[56] References Cited

U.S. PATENT DOCUMENTS

| 1,225,338 | 5/1917 | Kraemer et al. | 160/301 |
| 1,701,465 | 2/1929 | Sarran | 160/301 |
| 1,821,687 | 9/1931 | Baumann | 160/301 |
| 2,120,175 | 6/1938 | Fritz | 160/301 |

FOREIGN PATENT DOCUMENTS 2036837  7/1980  United Kingdom ................ 160/301

*Primary Examiner*—Ramon S. Britts
*Assistant Examiner*—David M. Purol
*Attorney, Agent, or Firm*—James G. Staples

[57] ABSTRACT

A window shade motor and a window shade roller assembly which is characterized by easier release and release with greater certainty, as contrasted to current construction, while having fewer parts which is based, in part, on arranging the pivot axes of the pawls closer to the center and a reduction of parts to as few as seven including a cage structure which performs several functions and which may easily be formed by progressive stamping.

15 Claims, 8 Drawing Figures

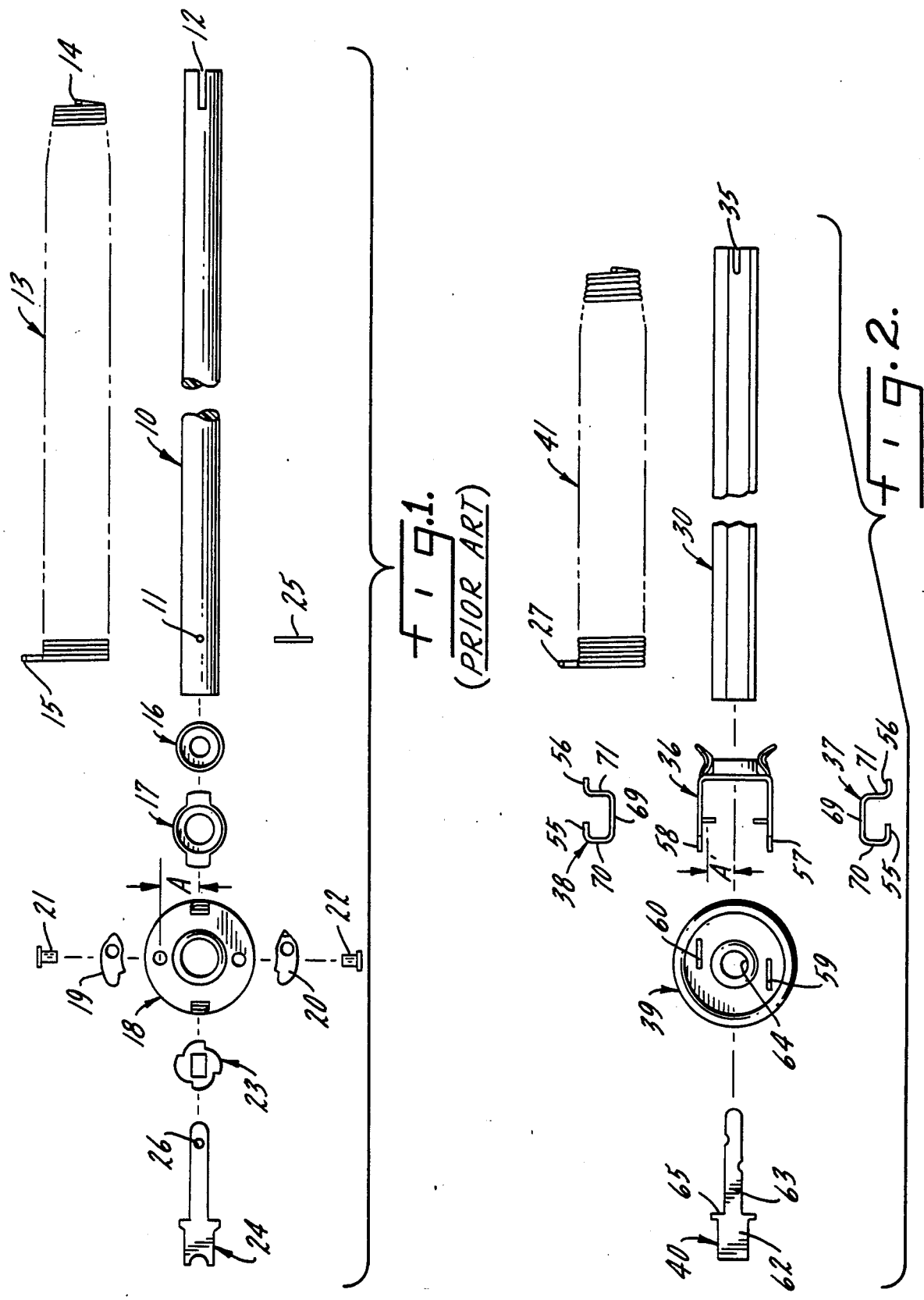

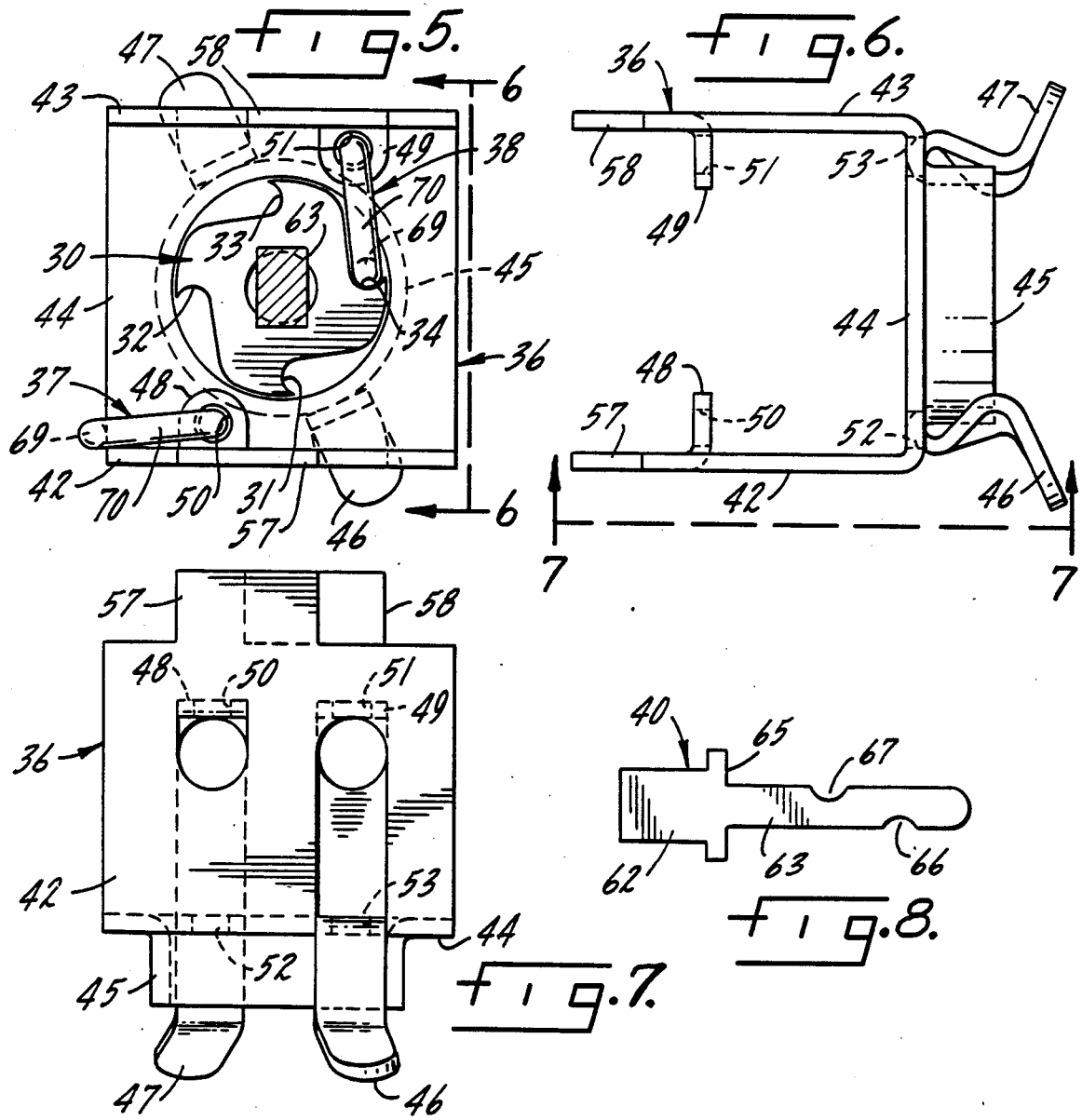

WINDOW SHADE MOTOR AND ROLLER ASSEMBLY

This invention relates generally to window shades, and, more specifically, firstly, to a retractable and extensible window shade roller assembly and, secondly, to a window shade motor useable in an extensible and retractable window shade roller assembly.

PRIOR ART

Motors for extensible and retractable window shades currently available on the market generally include a spring motor which is received on a stem and is connected, at one end, to the inner end of the stem (that is, the end closest to the center of the roller), and, at the other end, to a ratchet and pawl assembly which is carried by the round metal roller to which the flexible sheeting is secured.

A combination of gravity and centrifugal force effects the latching and release of the spring motor of shade rollers. Specifically: (a) gravity drops the pawl into the ratchet seat to latch the roller in position against the spring torque; and (b) centrifugal force is utilized to release the motor pawl and allow spring torque to raise the shade. In many shade motors, a ratchet with four stops and two pawls are used. A motor with the pawls spaced 180° apart will provide four latching points 90° apart.

Considering a conventional shade motor in the normal operating position, two ratchet seats will be on the upper side of the ratchet such that a pawl will fall first into one seat and with further rotation will ride up the ramp from that one seat and drop into the next seat as it is rotated through the upper 180°. If rotation continues this pawl, due to gravity, will not be able to engage either of the two ratchet seats in the lower 180°, but its counterpart #2 pawl at 180° opposite will be in position to fall into the two upper ratchet seats in succession as rotation continues.

Each pawl alternately becomes active only during the upper 180° of rotation. In a four seat, two pawl system, this alternate action provides stopping points of 90° intervals.

Release of the shade motor is accomplished by pulling (extending) the shade beyond its stopped point causing the seated pawl to ride up the ramp until it is resting on the ratchet's maximum diameter. If abruptly released from this point, the motor spring may be able to accelerate the reverse rotation rapidly enough to cause centrifugal force to keep the pawl from falling back into the seat, and the shade will be allowed to rise. If rotation is slowed until centrifugal force is reduced, gravity will draw one of the pawls into one of the top ratchet seats to again latch If release is attempted with the pawl in the upper "rising" quadrant, (this would be the first seat approached by a pawl while being rotated in the shade extending direction) centrifugal force alone must be relied upon to keep the pawl from re-seating at the start of reverse (retract) rotation, and requires high spring torque to overcome inertia and friction to achieve quick acceleration.

If release is attempted with the pawl in the upper "falling" guadrant, gravity will pull the pawl away from the ratchet seat as far as it is free to swing, and release is easier since more travel is allowed for a build up of centrifugal force. However, in this position, a very slight extend overtravel will bring the opposite pawl into the rising quadrant to latch and prevent the attempted release.

Conventional shade motors generally require quite a strong motor spring together with either additional turns of wire for the purpose of generating a pre-torque, or extra heavy spring wire (as contrasted to this invention) must be used to provide a higher initial torque. This requirement traces to the bearing system used in conventional rollers. Specifically, conventional rollers generally utilize a single bearing for maintaining coaxial alignment of the motor spring and its associated stem on which it is mounted.

The conventional single bearing shade motor allows the spring and stem to droop (a condition aggravated by the weight of the shade and roller) causing interference between the spring and the lockseam inside the roller tube.

Additional spring torque is then required to rotate the roller due to the oscillation of the stem and spring mass.

This adds to cost of manufacture since additional wire must be provided for pre-wrap turns for pre-torque, or heavier spring wire must be used to provide a higher initial torque.

Current window shade motors also have the disadvantage that release of the motor is not always as certain as a user might wish. Specifically, the conventional motor design cannot provide the range of pawl movement required for easy, certain release. Pawl swing is limited by the diameter of the motor pan, which in turn, is limited by the shade roller diameter.

In an apparent effort to improve the releasing characteristics of its product now on the market, one manufacturer has sacrificed the ability to latch at the conventional 90° intervals (four points per turn) and now offers stopping points at 120° intervals only, (three points per turn) a 33% reduction in shade level adjustment choices available to the user.

Though the structural details of prior art devices may differ from manufacturer to manufacturer, they are all characterized by a relatively large number of parts, such as about twelve or even more in some instances. Both the number of parts and the operations needed to assemble the parts into a working assembly contribute to the cost of the completed motor, and consequently it can be said in general that an increasing number of parts equates to increasing cost. In addition, the greater the number of parts, the greater the opportunity for malfunction and premature failure due to wear. In one conventional commercial form of window shade roller, a total of twelve parts are required. This total may, depending on the level of reliability sought by the manufacturer, increase by two additional parts.

Other motor constructions in the prior art include the disclosures in U.S. Pat. Nos. 113,879, 196,768, 271,691, 274,049, 278,037, 290,821, 299,256, 300,297, 906,542, 1,053,806, and 1,688,563. All of the motors disclosed in these patents require a relatively large number of parts or do not meet the high production, low cost standards which current window shade motors require.

In operation, some prior art motors (as mentioned above) require a substantial movement to initiate raising of the window shade when the window shade is in a down, or, more accurately, extended, position. Further, many prior art shade motors are not very reliable in that they require repeated attempts to release and raise the extended shade. Each failure to release, of course, leaves the shade extended even further, which can progress to a point of frustration.

By the same token some shade motors currently available require a significant movement of the sheeting past a desired extended position because the racket and pawl mechanism does not operate instantly when extending movement of the window shade ceases. In other words, in some commercial motors, the user must pull the shade in a downward, shade extending direction, to a position substantially beyond the desired position because the motor requires a reverse movement of a significant portion of a revolution of the roller before the pawl and rachet mechanism locks together.

SUMMARY OF THE INVENTION

A primary object of the invention is to provide an extensible and retractable window shade motor which releases much easier and with more certainty than does current window shade motors.

Another object is to provide a window shade motor which does not require as many pre-wrap turns as do conventional motors to generate pre-torque, or, alternatively, heavier spring wire to provide a higher initial torque, as contrasted to current constructions.

Another object of the invention is to provide an extensible and retractable window shade motor adapted for high production manufacture which consists of a smaller number of parts than the number of parts required in conventional motors.

Another object of the invention is to provide such a window shade motor which, including the spring, consists of only seven individual parts.

Another object of the invention is to provide a window shade motor which requires only a slight tug to initiate raising of the window shade from an extended position, as contrasted to the substantial movement required by certain conventional motors.

Other objects and advantages of the invention will become apparent from a reading of this specification.

DESCRIPTION OF THE DRAWING

The invention is illustrated more or less diagrammatically in the accompanying drawing wherein:

FIG. 1 is a view of a conventional extensible and retractable window shade motor with the parts disassembled and located, so far as possible, in their approximate relationship one to the other;

FIG. 2 is a view of the extensible and retractable window shade motor of this invention with the parts disassembled and located, so far as possible, in their approximate relationship one to the other;

FIG. 3 is a partial axial, sectional view with some parts in section of the motor end of an extensible and retractable window shade roller showing the parts of the motor of this invention in the assembled condition and in relation to a conventional metal roller;

FIG. 4 is an end view of the assembly shown in FIG. 3;

FIG. 5 is a sectional end view of the cage, stem, ratchet, and pawl assembly taken along line 5—5 of FIG. 3;

FIG. 6 is a side view of the cage taken along the line 6—6 of FIG. 5;

FIG. 7 is a end view of the cage shown in FIG. 6 taken along the line 7—7 of FIG. 6; and FIG. 8 is a view of the tang.

Like reference numerals will be used to describe like features and parts from Figure to Figure of the drawing.

DESCRIPTION OF THE PREFERRED EMBODIMENT

A conventional window shade motor is illustrated in FIG. 1. This motor is available on window shades currently offered for sale on the American market. The window shade motor assembly includes a stem 10 which, in this instance, is formed as a solid dowel with a cross drilled hole 11 at one end and a slot 12 at the other end. The stem may be formed of any suitable material such as plastic. A coil spring is indicated at 13.

It will be understood that the coil spring has a straight portion at its inner end, indicated at 14, which is intended to be received and held in slot 12, and another straight portion, indicated at 15, at the outer end, which is received and held in the pan 18.

A bushing is indicated at 16, a bushing cap, preferably made of metal, at 17, a pan at 18, a pair of pawls at 19 and 20 and rivets at 21 and 22.

A ratchet, or cam, is indicated at 23 and a tang at 24.

A pin is indicated at 25, the pin being of a size sufficient to be received within the cross drilled hole 11 in the stem 10 and in the hole 26 in tang 24.

It will thus be noted that the window shade motor illustrated in FIG. 1 consists of 12 separate and individually fabricated components. In addition, to ensure efficiency of operation, a cone and a washer (not illustrated) is often added to the construction thus making a total of at least twelve, and, often, as many as fourteen individual components.

The window shade motor of this invention is illustrated in FIG. 2. The motor consists of a stem 30 which, as is best illustrated in FIGS. 1 and 5, is formed with a plurality, in this instance four, grooves which extend from end to end of the stem indicated at 31-34. A slot 35 is formed in the inner end of the stem in order to secure the inner end of the coil spring in fixed and locked engagement with the stem.

A frame, or cage, is indicated generally at 36, the cage consisting of a single piece of sheet metal bent into a substantially U-shaped configuration as illustrated best in FIGS. 2 and 6. A pair of pawls formed from wire and carried by the cage are indicated at 37 and 38 as best illustrated in FIGS. 2 and 5. An end cap is indicated at 39, and a tang at 40.

The frame or cage, which is also sometimes referred to as a housing, is illustrated in greater detail in FIGS. 6 and 7 to which reference is now made. The frame includes a pair of sidewalls 42, 43 which are connected by a base or bight portion 44. A short collar is indicated at 45 formed in, and projecting downwardly from, the center of the bight portion 44 of the frame. The internal diameter of the collar is of a size sufficient to rotatably receive the stem 30 in a closely spaced, yet easily rotatable bearing relationship. A pair of spring hook tabs 46 and 47 are cut out of side walls 42, 43, respectively, each spring hook tab being formed with a generally U-shaped configuration, as shown best in FIG. 6 so as to form a convenient seat for the reception of the outer end 27 of coil spring 41.

A pair of pawl supports are indicated at 48 and 49, each pawl support being formed in the shape of an ear which extends inwardly from a side wall toward the center of the U-shaped frame. The pawl supports 48, 49 include holes hole 50, 51, respectively, which are axially aligned with similar holes 52, 53, repsectively, formed in the bight 44 of the frame.

The pawls 37, 38 each include a stem engaging section 69 from which arms 70 and 71 extend in a direction perpendicular to the axis of rotation of the stem. Each of the pawl arms 70, 71 terminates in a short stub shaft 55, 56, respectively, which are axially aligned one with the other. As will be best seen from FIGS. 5 and 6, the outer stub shaft is received in the hole 50 or 51 of pawl support 48 or 49, and the inner stub shaft 56 is received in the hole 52 or 53 formed in the bight portion of frame 36.

A pair of lock tabs is indicated at 57, 58, each lock tab being formed integrally with its associated sidewall 42, 43, respectively. The lock tabs extend outwardly through correspondingly shaped apertures 59, 60 in end cap 39 as best seen in FIGS. 2 and 4. Preferably the tabs are slightly twisted over that portion of their length which extends outwardly from the end cap 39 so that the stem 36 and end cap 39 are locked together as shown best in FIG. 4.

Tang 40 includes flat 62 which is arranged to be received in the conventional slot of a window shade bracket in which the window shade (of which the illustrated motor is a component) is to be hung. Tang 40 includes a shank portion 63 which extends through the central aperture 64 in the end cap (see FIG. 1) and into a hole at the outer end of stem 30.

Cross bar 65 prevents contact between rotating end cap 39 and the window shade mounting bracket, not shown. It also functions to prevent inadvertent unseating of the stem from the end cap bearing should the shade be bumped, dropped, etc. on end.

As best illustrated in FIG. 8, shank 63 may have indentations 66, 67 formed therein to lock the tang to stem 30 as by deformation of the material from which the stem is made. That is, if the cross section dimensions of the tang are just slightly oversize with respect to the hole in the outer end of the stem 30, the plastic material of the stem will be deformed as the tang is driven into the stem. When the tang comes to rest, the memory of the plastic material from which the stem is formed will cause the plastic to bulge into, to a slight extent, the depressions 66 and 67.

The use and operation of the invention is as follows:

Each of the component parts of the motor may be formed by a conventional extruding operation, as in the case of stem 30, or by sequential stamping operations as in the case of the frame 36, pawls 37, 38, cap 39 and tang 40. No rivets or pins are required since the conventional pivoted pawls illustrated, for example, at 19–22 in FIG. 1, have been eliminated. At the same time, a greater locking action between the wireform pawls 37 and 38 and stem 30 has been achieved by the substantial length of the pawls which engage the grooves 31–34 of stem 30 as contrasted with the short axial engagement of the conventional pawls 19, 20 with ratchet 23.

In assembling the motor to the shade roller, the bearing end cap 39 is crimped or otherwise secured to the end of the roller tube 68 having a hollow interior of a size sufficient to receive the motor, as illustrated best in FIG. 3.

In operation the tang 40 and stem 30 are maintained fixed with respect to their support location in all relative positions of the roller tube 68 with respect to the support location, whereas the frame 36, pawls 37, 38, and end cap 39 are free to rotate with the roller tube and the outer end of the coil spring 41.

The illustrated arrangement maintains coaxial alignment of the spring and the stem with the roller to a much greater degree than does the prior art construction illustrated in FIG. 1. Specifically, the illustrated construction provides a double bearing support for the spring and stem; the first bearing support is between the extreme outer, or left, end of the stem 30 where it seats into the end cap 39, and the second is the location on the stem 30 where it passes through collar 45. This double bearing stem support avoids the energy waste referred to earlier, and permits satisfactory operation with a shorter and less costly spring. Thus, the motor will operate over its full range with a lighter spring, fewer pre-torque turns, and a gentle easy action which is less likely to break away from the operator's grasp.

The unique construction of the disclosed invention provides far easier, more certain release, as contrasted to conventional motors due to the following features: (1) the pawls 37, 38 are allowed to fall, or swing, farther from the ratchet seats; (2) the pivot axis for the pawls 37, 38 is much closer to the ratchet stem as will be noted from comparing the pivot axis displacement A' of FIG. 2 with the pivot axis displacement A of FIG. 1; and (3) the weight distribution of the pawls 37, 38 provides for a large swing and thereby makes possible a very slow speed release; indeed, an actual over-center tip-away action occurs as best seen in FIG. 5.

It will further be noted that the conventional motor which, as currently marketed, consists of no less than 12 parts, has been greatly simplified. Specifically, the motor of the present invention consists of only seven parts, all of which can be as economically, or more economically, fabricated then can the greater number of parts in the conventional motor illustrated in FIG. 1.

In addition, it has been observed that an advantage of the disclosed invention is that it is easier to raise the window shade from an extended position. Specifically, and assuming a window shade is in a condition in which the shade material has been unwrapped from the roller and is therefore in an extended position, it has been discovered that only a slight tug is needed to move whichever one of pawls 37 or 38 is in engagement with one of the stem grooves 31–34 to initiate a retracting movement of the shade.

It has further been discovered that the disclosed invention provides a mechanism whereby a window shade can be stopped at more precise locations during extension and retraction of the shade. This appears to be attributable to the ease of operation of the pawls. In other words the pawls ride lightly over the surface of the grooves in the stem and instantly drop into engagement with a groove 31–34 when the extending force is removed from the window shade.

Although a preferred embodiment of the invention has been illustrated and described, it will at once be apparent to those skilled in the art that modifications of the invention can be made within the spirit and scope of the invention. Accordingly it is intended that the scope of the invention be limited solely by the scope of the hereinafter appended claims when interpreted in light of the relevant prior art, and not by the specific disclosure in the foregoing specification.

I claim:

1. A window shade assembly whose components remain in radially fixed relationship to one another, said window shade roller assembly including a roller which is hollow at one outer end to receive a motor, a motor in the hollow end of the roller, said motor including a coil spring having an inner end and an outer end, a stem in the coil spring, the inner end of the coil spring being held in fixed relationship to the stem, and means for securing and unsecuring the outer end of the coil spring to the roller, said means consisting of firstly, an outer stem bearing support member which receives the stem in a rotatable, contacting bearing relationship to provide a first bearing means, secondly, an inner stem bearing support member which receives the stem in rotatable, contacting bearing relationship to provide a second bearing means, said second bearing means being spaced inwardly from the first bearing means to thereby provide a plurality of bearing means, and thirdly, mechanical locking means for securing said outer end of the coil spring to the roller between extending and retracting movement of the roller assembly, and spacing means at the outer end portion of the stem which separates the first bearing means from the second bearing means a distance sufficient to maintain the roller and stem in fixed, radially spaced relationship to one another, said spacing means forming the sole means for spacing said first and second bearing means.

2. The window shade roller assembly of claim 1 further characterized in that said mechanical locking means includes means fixing the outer bearing support member to the roller, and a gravity and centrifugal force locking mechanism carried by the outer bearing support member and operative to lock and unlock the outer bearing support member to the stem upon inital rotation of the roller.

3. The window shade roller assembly of claim 2 further characterized in that the gravity and centrifugal force locking mechanism includes two pawls carried by the outer bearing support member, and indentations formed in the stem in a position adapted to co-act with the pawls whereby engagement of a pawl with a stem indentation in a manner to resist rotation of the stem locks the stem to the outer bearing support member.

4. The window shade assembly of claim 3 further characterized in that the pawls are formed of wire and each pawl is supported from two points along an axis for movement into and out of engagement with a groove in the stem, said axis for each pawl (a) being parallel to, and spaced radally from, the axis of the stem, and (b) being spaced from the other pawl axis.

5. The window shade roller assembly of claim 4 further characterized in that the inner stem bearing support member is rigid with respect to the outer stem bearing support member, said inner bearing support member being locked to the outer bearing support member.

6. The window shade roller assembly of claim 5 further characterized in that the means for mechanically locking the end of the coil spring to the roller between extending and retracting movements of the roller assembly includes a projection carried by the outer stem bearing support member, which projection is arranged to lock to the outer end of the spring whereby the outer end of the spring rotates with the outer stem bearing support member.

7. A window shade roller assembly whose components remain in radially fixed relationship to one another, said window shade roller assembly including, in combination, a roller, said roller having, at each end, means for supporting the roller from an associated support location, such as a window bracket, one end of the roller having an opening of a size sufficient to receive a window shade motor, said window shade motor including, in combination, a coil spring, a stem, one end of the coil spring being held in fixed relationship to the stem, and means for releasably securing the outer end of the coil spring to a window shade roller within which the motor is received, said means including a frame, the other end of said coil spring being secured to, and rotatable with, the frame, said stem extending through a portion of said frame, a bearing cap carried by the frame which forms a first bearing means, a second bearing means carried by the frame and spaced inwardly from the first bearing means a distance sufficient to maintain the stem and roller in fixed radial relationship one to the other, a tang extending through said bearing cap and into locked engagement with said stem, said tang forming one of said support means, said frame, outer end of the coil spring, and bearing cap being rotatable with respect to the stem and tang, and pawl means carried by the frame and being pivotable from a first position in which said pawl means are not in locking engagement with the stem to a second position in which said pawl means are in locking engagement with the stem whereby movement of the frame, bearing cap and pawls with respect to the stem and tang is precluded.

8. The window shade roller assembly of claim 7 further characterized in that the pawl means comprises two pawls.

9. The window shade roller assembly of claim 8 further characterized in that the pawls are formed from wire.

10. The window shade roller assembly of claim 7 further characterized in that the second bearing means is a collar carried by the frame.

11. A window shade motor for a window shade roller assembly, said motor including, in combination, a coil spring having an inner end and an outer end a stem in the coil spring, the inner end of the coil spring being held in fixed relationship to the stem, and means for securing and unsecuring the outer end of the coil spring to a roller with which the motor is to be associated, said means consisting of firstly, an outer stem bearing support member which receives the stem in rotatable, contacting bearing relationship to provide a first bearing means, secondly, an inner stem bearing support member which receives the stem in a rotatable, contacting bearing relationship to provide a second bearing means, said second bearing means being spaced inwardly from the first bearing means to thereby provide a plurality of bearing means for the stem, thirdly, mechanical locking means adapted to secure said outer end of the coil spring to a roller between extending and retracting movement of the roller assembly with which the motor is to be associated, and spacing means at the outer end portion of the stem which separates the first bearing means from the second bearing means a distance of sufficient to maintain the roller and stem in fixed radially spaced relationship to one another, said spacing means forming the sole means for spacing said first and second bearing means.

12. The window shade motor of claim 10 further characterized in that said means includes spacing a frame, the other end of said coil spring being secured to, and rotatable with, the frame, said stem extending through a portion of said frame, a bearing cap carried by the frame, a tang extending through said bearing cap and into locked engagement with said stem, said frame, other end of the coil spring, and bearing cap being rotatable with respect to the stem and tang, and pawl means carried by the frame and being pivotable from a first position in which said pawl means are not in locking engagement with the stem to a second position in which said pawl means are in locking engagement with the stem whereby movement of the frame, bearing cap and pawls with respect to the stem and tang is precluded.

13. The window shade motor of claim 12 further characterized in that the pawls are formed from wire.

14. The window shade motor of claim 13 further characterized in that the frame includes two pairs of pawl supporting members, each pair of members comprising a projection whereby an associated pawl is pivotably supported from two locations axially spaced from one another.

15. The window shade motor of claim 12 further characterized in that the frame includes coil spring retaining means for securing the other end of the coil spring to the frame.

* * * * *